(12) United States Patent
Islam et al.

(10) Patent No.: US 11,424,643 B2
(45) Date of Patent: Aug. 23, 2022

(54) BUILDING MANAGEMENT SYSTEM WITH ENERGY OPTIMIZATION USING BLOCKCHAIN

(71) Applicant: Johnson Controls Tyco IP Holdings LLP, Milwaukee, WI (US)

(72) Inventors: Akib Islam, Dhubri (IN); Amandeep Singh Johar, Uttar Pradesh (IN); Ankur Thareja, Alwar (IN); Sachin Yashwant Pate, Mumbai (IN)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 200 days.

(21) Appl. No.: 16/283,532

(22) Filed: Feb. 22, 2019

(65) Prior Publication Data
US 2020/0274389 A1  Aug. 27, 2020

(51) Int. Cl.
*H02J 13/00* (2006.01)
*H04L 9/06* (2006.01)
*G06Q 50/06* (2012.01)
*H02J 3/28* (2006.01)
*H02J 3/00* (2006.01)

(52) U.S. Cl.
CPC .......... *H02J 13/0013* (2013.01); *G06Q 50/06* (2013.01); *H02J 3/28* (2013.01); *H04L 9/0637* (2013.01); *H02J 3/003* (2020.01); *H02J 2310/64* (2020.01); *H04L 2209/38* (2013.01)

(58) Field of Classification Search
CPC ...... H02J 13/0013; H02J 3/28; H02J 2310/64; H02J 3/003; G06Q 50/06; H04L 9/0637; H04L 2209/38
See application file for complete search history.

(56) References Cited

U.S. PATENT DOCUMENTS

| | | | |
|---|---|---|---|
| 2004/0225649 A1* | 11/2004 | Yeo | G01D 4/004 |
| 2007/0255612 A1* | 11/2007 | Baraty | G06Q 50/06 |
| | | | 702/61 |
| 2017/0206522 A1* | 7/2017 | Schiatti | G06Q 50/06 |
| 2017/0358041 A1* | 12/2017 | Forbes, Jr. | H02J 13/0086 |
| 2018/0285840 A1* | 10/2018 | Hasan | G06Q 20/0655 |
| 2019/0086235 A1* | 3/2019 | Cui | H02J 13/0086 |
| 2019/0109891 A1* | 4/2019 | Paruchuri | H04L 29/06 |

(Continued)

*Primary Examiner* — Michael D Masinick
(74) *Attorney, Agent, or Firm* — Foley & Lardner LLP

(57) ABSTRACT

A building management system is communicably connected to an energy blockchain network to reduce energy costs of a building. The system includes an energy load balancer to distribute energy from a plurality of energy suppliers to power a load in the building, a processor, and memory storing instructions that causes the processor to: monitor energy pricing data from each of the energy suppliers; calculate a balanced load payload corresponding to an energy demand forecast for the building according to the energy pricing data from the energy suppliers; generate a smart contract corresponding to the balanced load payload in blocks of the energy blockchain network to procure energy from corresponding ones of the energy suppliers; and generate load balancing instructions for the energy load balancer based on the smart contract. The energy load balancer switches between the corresponding ones of the energy suppliers according to the load balancing instructions.

20 Claims, 8 Drawing Sheets

(56) References Cited

U.S. PATENT DOCUMENTS

| | | | |
|---|---|---|---|
| 2019/0164236 A1* | 5/2019 | Mayne | G06Q 20/389 |
| 2019/0236559 A1* | 8/2019 | Padmanabhan | G06F 21/64 |
| 2020/0148071 A1* | 5/2020 | Singh | B60L 53/14 |
| 2020/0161858 A1* | 5/2020 | Wang | H02J 3/06 |

* cited by examiner

BUILDING MANAGEMENT SYSTEM WITH ENERGY OPTIMIZATION USING BLOCKCHAIN

BACKGROUND

The present disclosure relates generally to building management systems or building automation systems. The present disclosure relates more particularly to building management systems having an energy blockchain network for energy optimization. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Generally, energy costs is one of the greatest operational expenses for many businesses—with every dollar that is unnecessarily spent on energy consumption being a lost opportunity to invest in other parts of the business. Accordingly, some BMSs optimize energy based on reducing energy consumption, for example, by identifying "energy hogs" and/or managing loads within a building. While these BMSs emphasize reducing energy consumption in order to optimize energy, energy procurement is generally handled manually by a human. However, energy procurement can play a vital role in energy optimization and operational cost reduction. With the increased volatility of the energy market in the United States and other countries, manual procurement of energy increases the risk of human errors, which can lead to increased operational costs. Further, manual procurement of energy is time-consuming due to manual execution and validation of contracts, which can take approximately 15-20 days or more. Thus, manual procurement of energy can impede or prevent dynamic switching of energy suppliers autonomously based on energy pricing of the energy suppliers and energy needs for a building.

Accordingly, systems and methods that reduce or optimize energy costs by intelligently procuring energy from various energy suppliers and autonomously switching between the energy suppliers in real-time (or near real-time) based on energy pricing and energy needs may be desired.

The above information disclosed in this Background section is for enhancement of understanding of the background of the invention, and therefore, it may contain information that does not constitute prior art.

SUMMARY

According to an example embodiment, a building management system communicably connected to an energy blockchain network to reduce energy costs of a building is provided. The system includes an energy load balancer configured to distribute energy from a plurality of energy suppliers to power a load in the building, one or more processors, and memory coupled to the one or more processors. The memory stores instructions that, when executed by the one or more processors, cause the one or more processors to: monitor energy pricing data from each of the plurality of energy suppliers; calculate a balanced load payload corresponding to an energy demand forecast for the building according to the energy pricing data from the plurality of energy suppliers; generate a smart contract corresponding to the balanced load payload in one or more blocks of the energy blockchain network, the smart contract corresponding to an agreement by one or more of the energy suppliers to provide energy to power at least a portion of the balanced load payload based on the energy pricing data; and generate load balancing instructions for the energy load balancer based on the smart contract. The energy load balancer is configured to switch between ones of the plurality of energy suppliers according to the load balancing instructions.

In some embodiments, to generate the smart contract, the instructions may further cause the one or more processors to: generate a smart contract proposal corresponding to the balanced load payload; provide a chaincode simulation corresponding to the smart contract proposal to the one or more of the energy suppliers or to a user associated with the building; and receive an endorsement of the chaincode simulation from the one or more of the energy suppliers or from the user associated with the building according to an endorsement policy of the chaincode simulation.

In some embodiments, to generate the smart contract, the instructions may further cause the one or more processors to: arrange proposed transactions corresponding to the smart contract proposal in a sequence order; pack the proposed transactions in the one or more blocks of the energy blockchain network; and distribute the one or more blocks to the one or more energy suppliers or to the user associated with the building.

In some embodiments, to generate the smart contract, the instructions may further cause the one or more processors to: receive validation of the one or more blocks from the one or more energy suppliers or from the user associated with the building; and append the one or more blocks to one or more ledger databases associated with the one or more energy suppliers or the user associated with the building.

In some embodiments, the instructions may further cause the one or more processors to: receive an event notification in response to the one or more blocks being appended to the one or more ledger databases; and generate the load balancing instructions in response to the event notification.

In some embodiments, to calculate the balanced load payload, the instructions may further cause the one or more processors to: collect data from one or more devices associated with building equipment of the building; calculate energy load consumption data based on the data collected from the one or more devices; calculate the energy demand forecast based on the energy load consumption data, the energy demand forecast corresponding to a predicted load amount for the building during an interval of time; and balance the predicted load amount across supply lines corresponding to the plurality of energy suppliers based on the energy pricing data.

In some embodiments, the energy blockchain network may be a private permissioned blockchain network.

According to another embodiments, a method for reducing energy costs of a building is provided. The method includes: monitoring, by one or more processors, energy pricing data from each of a plurality of energy suppliers; calculating, by the one or more processors, a balanced load payload corresponding to an energy demand forecast for the building according to the energy pricing data from the plurality of energy suppliers; generating, by the one or more processors, a smart contract corresponding to the balanced load payload in one or more blocks of an energy blockchain network, the smart contract corresponding to an agreement by one or more of the energy suppliers to provide energy to power at least a portion of the balanced load payload based on the energy pricing data; and generating, by the one or more processors, load balancing instructions for an energy load balancer of the building based on the smart contract.

The energy load balancer is configured to switch between ones of the plurality of energy suppliers according to the load balancing instructions.

In some embodiments, to generate the smart contract, the method may further include: generating, by the one or more processors, a smart contract proposal corresponding to the balanced load payload; providing, by the one or more processors, a chaincode simulation corresponding to the smart contract proposal to the one or more of the energy suppliers or a user associated with the building; and receiving, by the one or more processors, an endorsement of the chaincode simulation from the one or more of the energy suppliers or from the user associated with the building according to an endorsement policy of the chaincode simulation.

In some embodiments, to generate the smart contract, the method may further include: arranging, by the one or more processors, proposed transactions corresponding to the smart contract proposal in a sequence order; packing, by the one or more processors, the proposed transactions in the one or more blocks of the energy blockchain network; and distributing, by the one or more processors, the one or more blocks to the one or more energy suppliers or the user associated with the building.

In some embodiments, to generate the smart contract, the method may further include: receiving, by the one or more processors, validation of the one or more blocks from the one or more energy suppliers or from the user associated with the building; and appending, by the one or more processors, the one or more blocks to one or more ledger databases associated with the one or more energy suppliers or the user associated with the building.

In some embodiments, the method may further include: receiving, by the one or more processors, an event notification in response to the one or more blocks being appended to the one or more ledger databases; and generating, by the one or more processors, the load balancing instructions in response to the event notification.

In some embodiments, to calculate the balanced load payload, the method may further include: collecting, by the one or more processors, data from one or more devices associated with building equipment of the building; calculating, by the one or more processors, energy load consumption data based on the data collected from the one or more devices; calculating, by the one or more processors, the energy demand forecast based on the energy load consumption data, the energy demand forecast corresponding to a predicted load amount for the building during an interval of time; and balancing, by the one or more processors, the predicted load amount across supply lines corresponding to the plurality of energy suppliers based on the energy pricing data.

In some embodiments, the energy blockchain network may be a private permissioned blockchain network.

According to another embodiment, one or more non-transitory computer readable media containing program instructions are provided. When executed by one or more processors, the program instructions cause the one or more processors to perform operations including: monitoring energy pricing data from each of a plurality of energy suppliers; calculating a balanced load payload corresponding to an energy demand forecast for a building according to the energy pricing data from the plurality of energy suppliers; generating a smart contract corresponding to the balanced load payload in one or more blocks of an energy blockchain network, the smart contract corresponding to an agreement by one or more of the energy suppliers to provide energy to power at least a portion of the balanced load payload based on the energy pricing data; and generating load balancing instructions for an energy load balancer of the building based on the smart contract, wherein the energy load balancer is configured to switch between ones of the plurality of energy suppliers according to the load balancing instructions.

In some embodiments, to generate the smart contract, the instructions may further cause the one or more processors to perform operations including: generating a smart contract proposal corresponding to the balanced load payload; providing a chaincode simulation corresponding to the smart contract proposal to the one or more of the energy suppliers or a user associated with the building; and receiving an endorsement of the chaincode simulation from the one or more of the energy suppliers or from the user associated with the building according to an endorsement policy of the chaincode simulation.

In some embodiments, to generate the smart contract, the instructions may further cause the one or more processors to perform operations including: arranging proposed transactions corresponding to the smart contract proposal in a sequence order; packing the proposed transactions in the one or more blocks of the energy blockchain network; and distributing the one or more blocks to the one or more energy suppliers or the user associated with the building.

In some embodiments, to generate the smart contract, the instructions may further cause the one or more processors to perform operations including: receiving validation of the one or more blocks from the one or more energy suppliers or from the user associated with the building; and appending the one or more blocks to one or more ledger databases associated with the one or more energy suppliers or the user associated with the building.

In some embodiments, the instructions may further cause the one or more processors to perform operations including: receiving an event notification in response to the one or more blocks being appended to the one or more ledger databases; and generating the load balancing instructions in response to the event notification.

In some embodiments, to calculate the balanced load payload, the instructions may further cause the one or more processors to perform operations including: collecting data from one or more devices associated with building equipment of the building; calculating energy load consumption data based on the data collected from the one or more devices; calculating the energy demand forecast based on the energy load consumption data, the energy demand forecast corresponding to a predicted load amount for the building during an interval of time; and balancing the predicted load amount across supply lines corresponding to the plurality of energy suppliers based on the energy pricing data.

DETAILED DESCRIPTION

Overview

Figure 1:
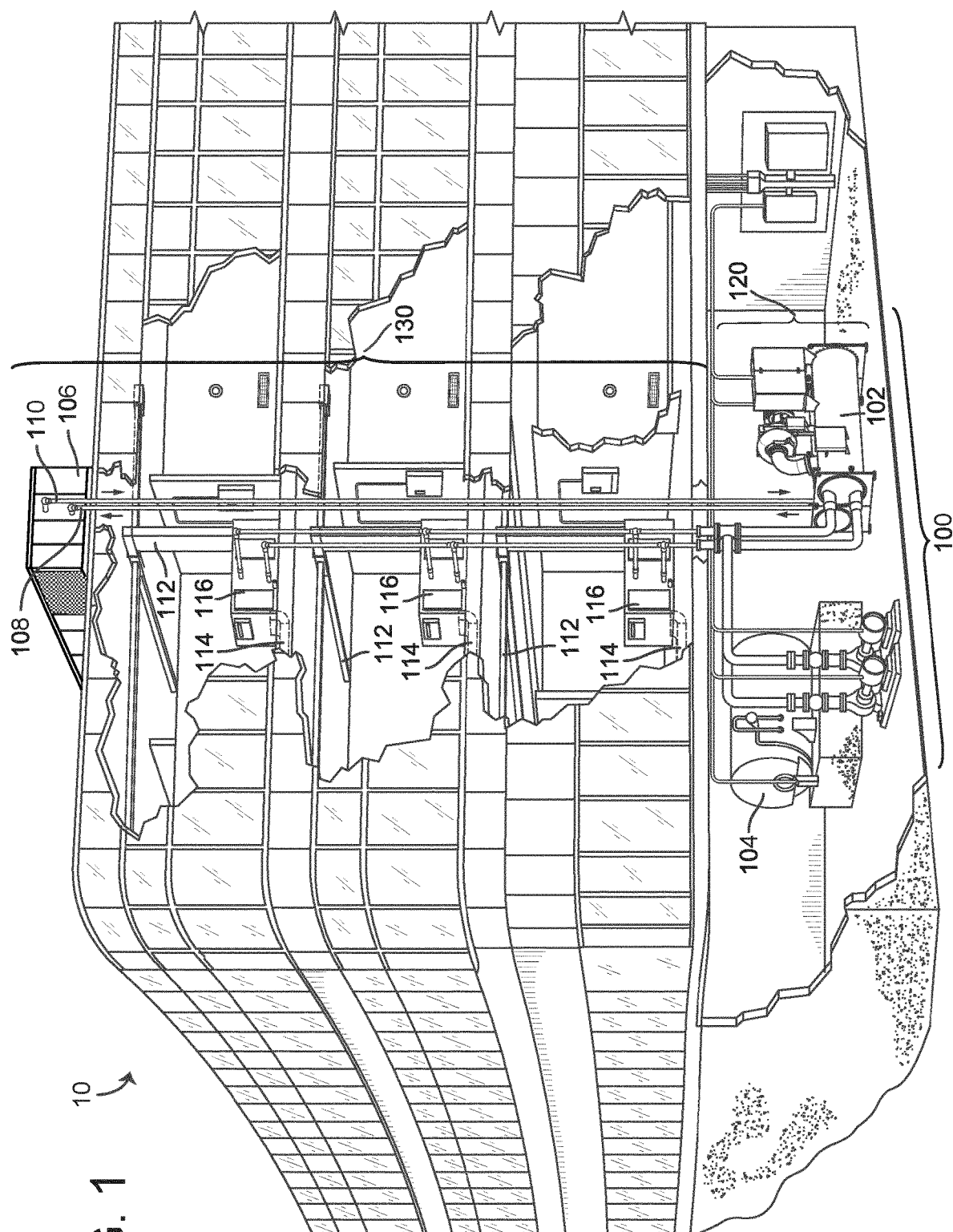
FIG. 1 is a drawing of a building equipped with a HVAC system, according to an example embodiment.

Referring generally to the FIGURES, the systems and methods discussed herein relate to a building management system (BMS) that can intelligently procure energy from various available energy suppliers to dynamically switch between the energy suppliers in real-time (or near real-time) based on energy prices and projected energy needs. For example, in some embodiments, the BMS is communicably connected to a plurality of energy suppliers, and is configured to monitor energy prices from each of the energy suppliers, for example, such as current energy prices, forecasted energy prices, peak timings, off-peak timings, and/or the like. In some embodiments, the BMS monitors and/or collects data from a building (e.g., from the systems, subsystems, and devices within the building), and calculates energy consumption data and energy demand forecasts for the building based on the collected data. In some embodiments, the energy demand forecasts are used to determine how much energy to procure and when the energy will be needed from one or more of the energy suppliers. In some embodiments, the BMS balances loads across various energy supply lines to consume energy from multiple energy suppliers concurrently (or simultaneously) in real-time or near real-time to reduce peak time energy charges. In some embodiments, the BMS distributes loads across various energy supply lines to switch between one or more of the energy suppliers in real-time or near real-time to supply energy to the building at a reduced or optimized energy cost.

In some embodiments, the systems and methods discussed herein utilize blockchain technology to generate smart contracts for a balanced load payload corresponding to the energy demand forecasts, and to facilitate execution of the smart contracts to procure energy from the energy suppliers in real-time (or near real-time). For example, in some embodiments, an energy blockchain network is formed corresponding to a smart contract based on terms and conditions of the smart contract, existing contracts with the energy suppliers, and the balanced load payload for each supply line of the energy suppliers. In some embodiments, the block chain network enables interested parties (e.g., building owners, building managers, energy suppliers, and/or the like) to endorse, verify, and validate the smart contract. In some embodiments, once the smart contract is accepted (e.g., endorsed, verified, and validated) by all of the interested parties, blocks corresponding to the smart contract proposal are appended to a ledger database of each of the interested parties (e.g., the interested energy suppliers). Thus, the energy needs of the building can be procured in real-time or near real-time from various energy suppliers concurrently (or simultaneously) by generating highly secured smart contracts using blockchain technology.

In various embodiments, the systems and methods described herein improve existing BMS technology by enabling procurement of energy in real-time or near real-time by using blockchain technology based on projected or forecasted energy needs of the building and energy pricing of various energy suppliers. In some embodiments, the BMS systems described herein can intelligently procure energy from the best and cost-effective energy suppliers available in the region based on their contract terms, energy charges, peak demand charges, demand ratchet pricing, electric delivery charges, time of use charges, and/or the like. In some embodiments, the BMS systems described herein can monitor the real-time energy pricing of the energy suppliers, procure energy from multiple suppliers, and autonomously balance load across multiple supply lines based on accurate forecasting results in real-time or near real-time. In some embodiments, contract execution for procuring energy via blockchain technology is real-time or near real-time, and thus, due to fast contract execution time, the amount of energy procured from each energy supplier can be adjusted in real-time or near real-time. In some embodiments, the BMS systems described herein can integrate energy optimization strategies with intelligent decision making to facilitate autonomous energy procurement from a single platform. In some embodiments, by using blockchain technology, energy procurement and energy optimization processes are highly secured and transparent to the customer (e.g., building operator, building owner, and/or the like). In some embodiments, the BMS systems described herein can realize bigger savings in a customer's energy bill by identifying hidden energy saving potentials through load balancing and distributed energy procurement. In some embodiments, the BMS systems described herein can be integrated with other third-party blockchain based smart grid and micro grid energy procurement platforms.

Building Automation System with HVAC System

Referring now to FIGS. 1-4, an example building automation system (BAS) and HVAC system in which the systems and methods of the present invention can be implemented are shown, according to an example embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An example waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
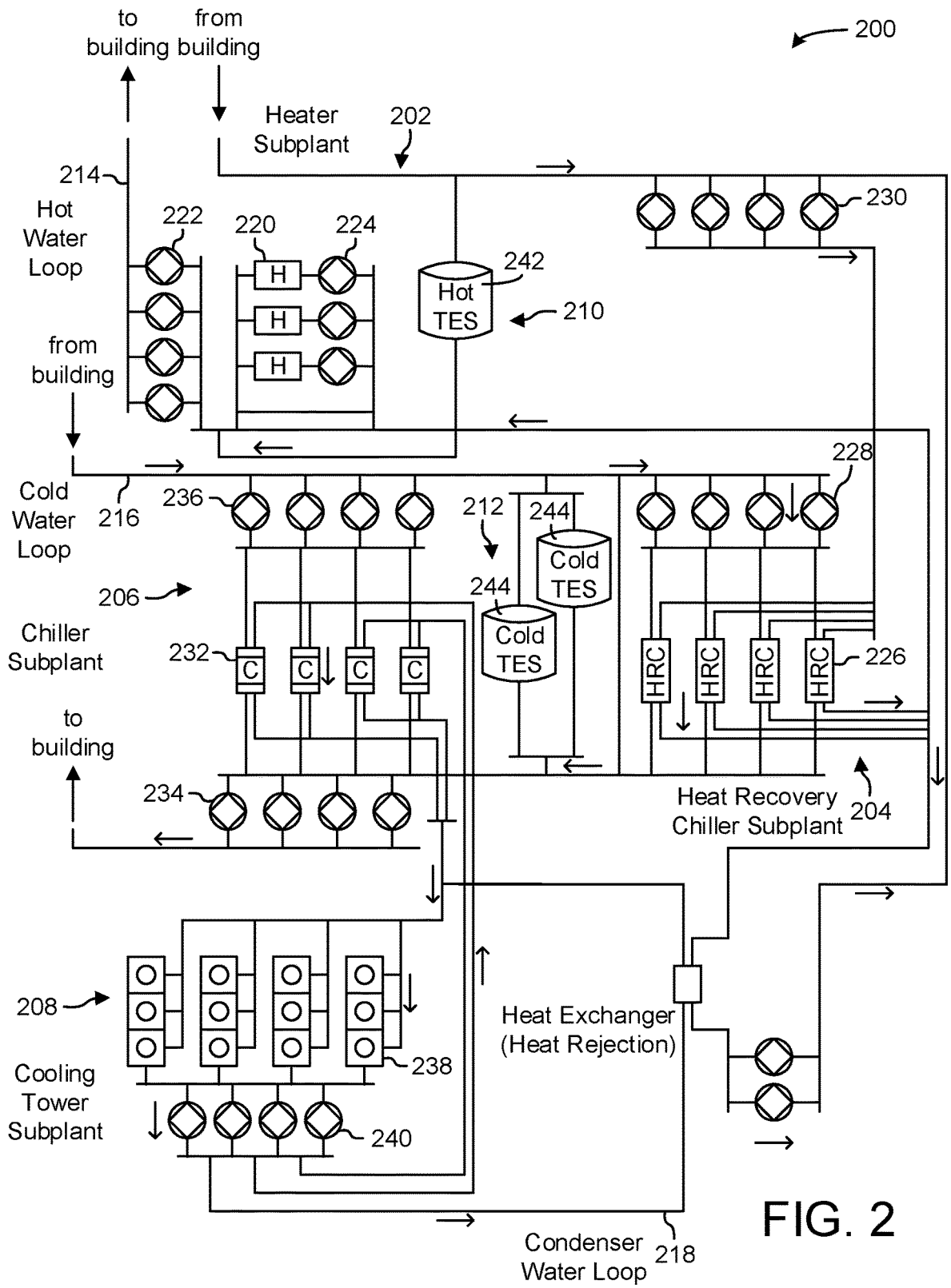
FIG. 2 is a block diagram of a waterside system that may be used in conjunction with the building of FIG. 1, according to an example embodiment.

Referring now to FIG. 2, a block diagram of a waterside system 200 is shown, according to an example embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
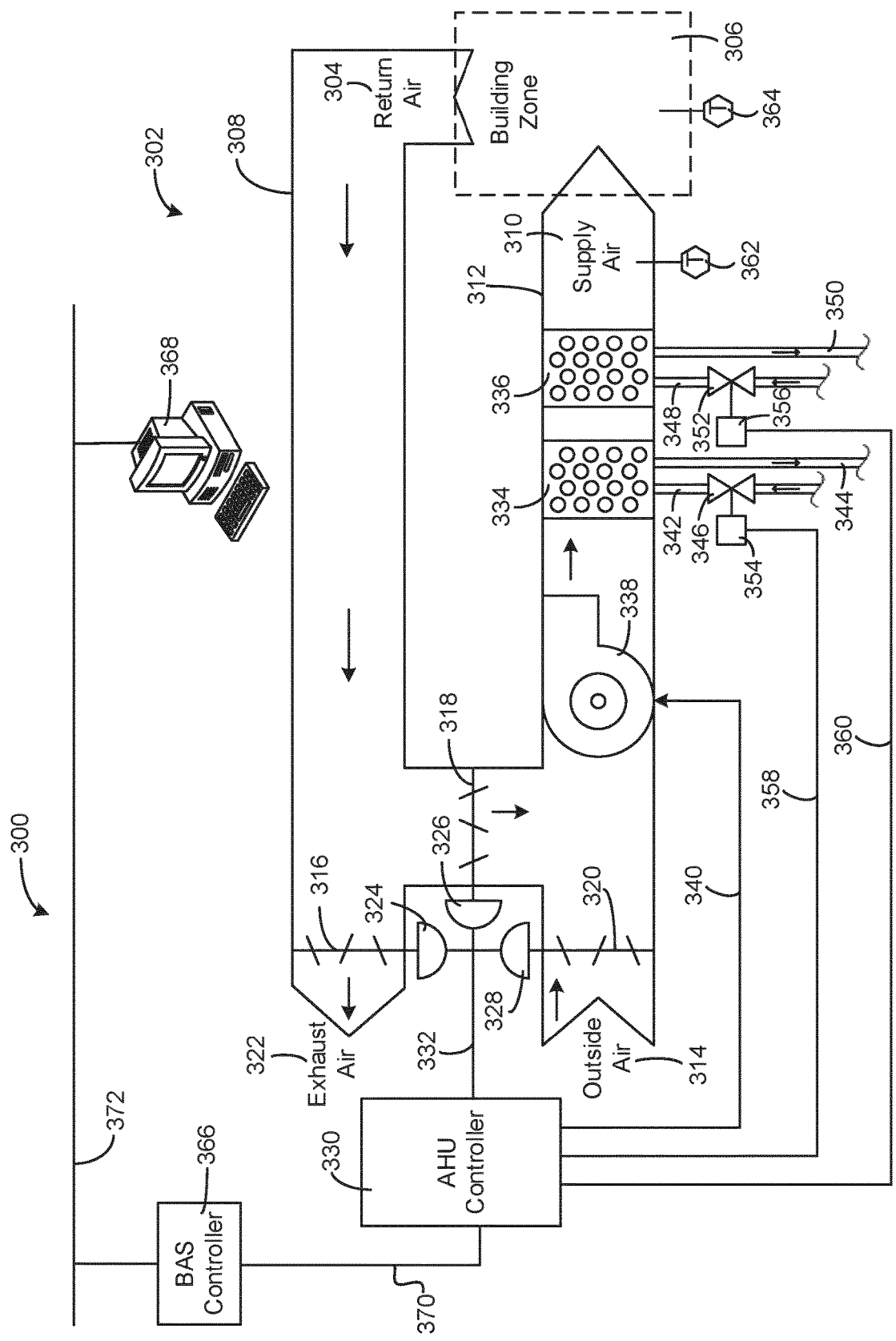
FIG. 3 is a block diagram of an airside system that may be used in conjunction with the building of FIG. 1, according to an example embodiment.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
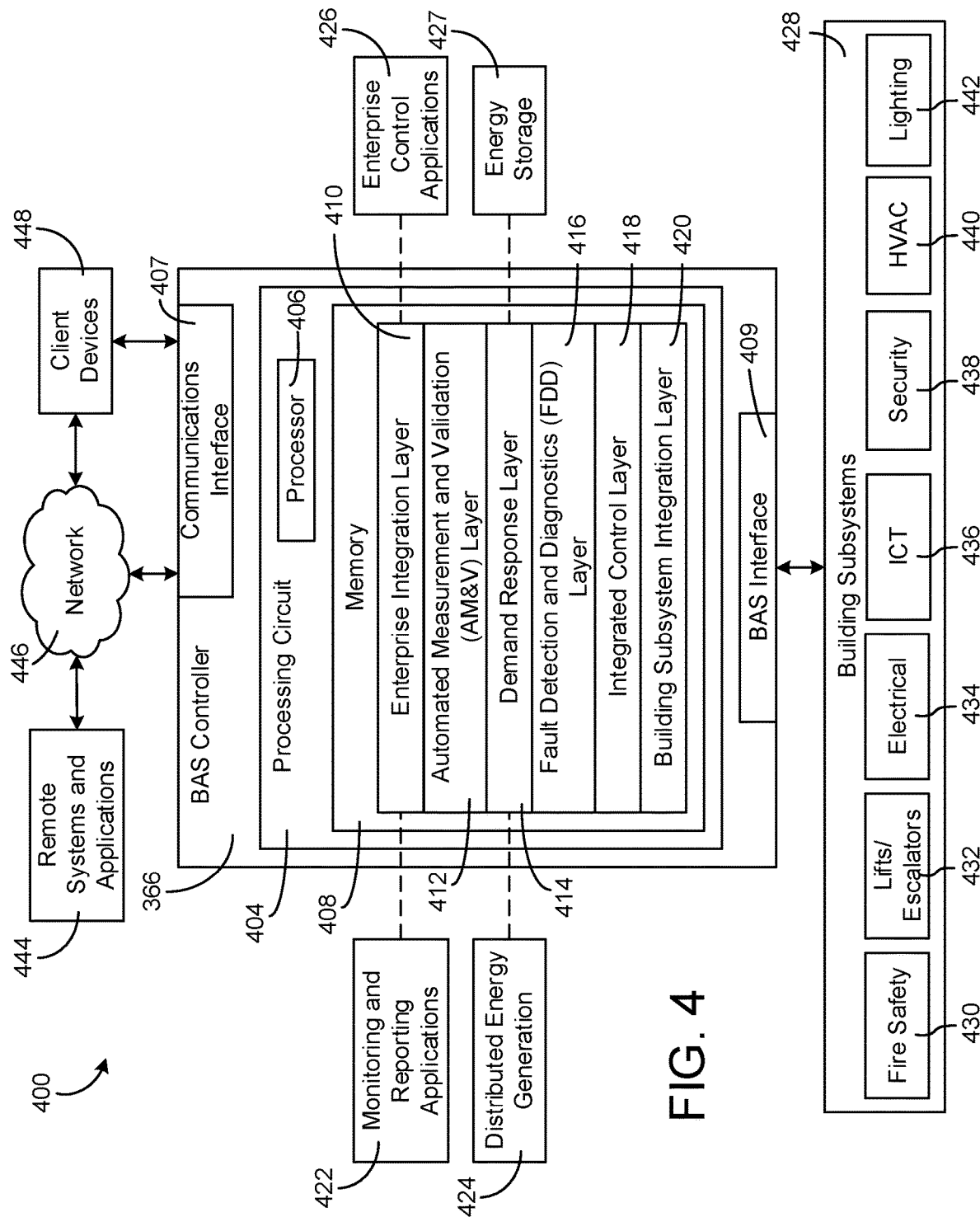
FIG. 4 is a block diagram of a building automation system that may be used to monitor and/or control the building of FIG. 1, according to an example embodiment.

Referring now to FIG. 4, a block diagram of a building automation system (BAS) 400 is shown, according to an example embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Although some embodiments in the specification are described primarily with reference to HVAC equipment, it should be understood that the systems and methods described herein can be applicable to a wide variety of building equipment and/or other types of connected devices (e.g., HVAC equipment, LED lights, lighting systems mobile phones, elevator systems, fire safety systems, security systems, smart street lamps, cars, televisions, etc.) with embedded intelligence and communication capabilities.

Energy Management System with Energy Blockchain Network

Figure 5:
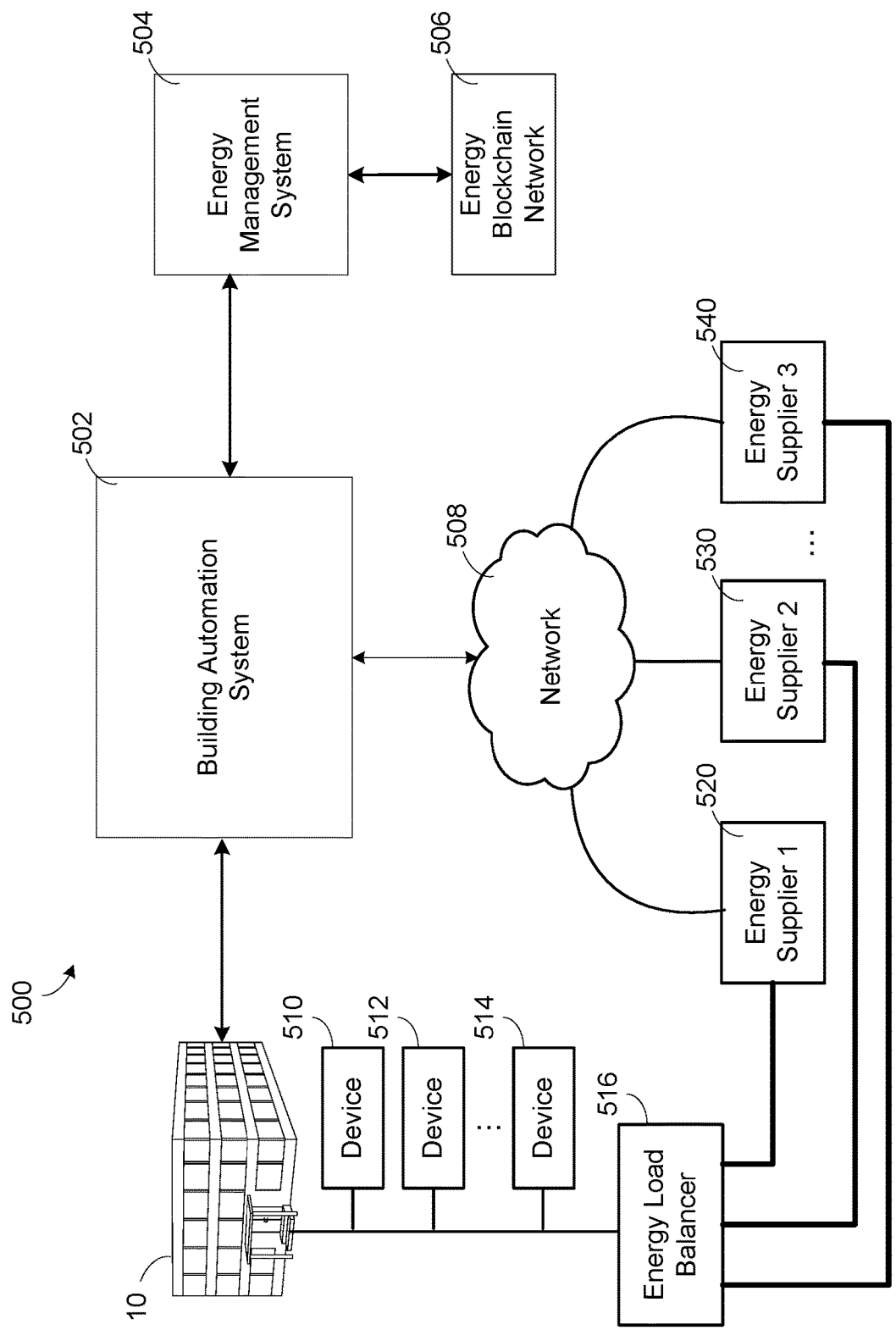
FIG. 5 is a block diagram of a building management system, according to an example embodiment.

Referring now to FIG. 5, a block diagram of a building management system 500 is shown, according to some embodiments. BMS 500 is shown to include a building automation system 502 (BAS), an energy management system 504, and an energy blockchain network 506. The BAS 502 can be configured to collect data from a variety of different data sources, and may be the same as or similar to the BAS 400 described with reference to FIG. 4. For example, the BAS 502 is shown collecting data from building 10. Building 10 may be the same as or similar to building 10 shown in FIG. 1. In some embodiments, building 10 includes one or more devices 510, 512, and 514, such as building equipment, metering devices, security devices, mini computers, sensors, internet of things (IoT) devices, and/or any other suitable devices that collect and/or send data to the BAS 502. For example, in some embodiments, each of the devices 510, 512, and 514 may be any suitable device associated with the systems, subsystems, building equipment, sensors, or devices described with reference to FIGS. 1-4. In some embodiments, building 10 includes an energy load balancer 516 that is connected to each of a plurality of energy suppliers 520, 530, and 540 via a corresponding energy supply line. In some embodiments, the energy load balancer 516 distributes energy from the plurality of energy suppliers 518 to a load of the building 10 based on load balancing instructions provided by the BAS 502 (or the energy management system 504).

In some embodiments, the BAS 502 calculates energy load consumption data (or energy usage data) for building 10 based on the collected data to determine when and how much energy is consumed by building 10 at any given time. In some embodiments, the BAS 502 stores historical values of the energy load consumption data for building 10 in a data storage device (e.g., storage 614 or other storage device). In some embodiments, the BAS 502 determines occupancy data (e.g., occupancy status, occupancy time, and/or the like) temperature data (e.g., outside temperature, zone temperature, setpoint temperature, and/or the like), temperature schedule, lighting schedule, and/or the like from the collected data, and stores the collected data in a data storage device (e.g., storage 614 or other storage device). In some embodiments, the BAS 502 optimizes energy usage or consumption of building 10 based on the energy load consumption data, for example, by identifying waste, managing loads, providing alternative schedules (e.g., temperature or lighting), identifying malfunctions, and/or the like. In some embodiments, the BAS 502 provides load balancing instructions to control the energy load balancer 516 to dynamically distribute energy from the energy suppliers 520, 530, and 540 to building 10.

In various embodiments, the BMS 500 autonomously procures energy for building 10 based on energy prices of various energy suppliers and projected (or forecasted) energy load demands of building 10. For example, in some embodiments, the BMS 500 (e.g., via the BAS 502 or the energy management system 504) is communicably connected to each of the energy suppliers 520, 530, and 540 over network 508 (e.g., a WAN, the Internet, a cellular network, etc.), to monitor energy pricing data from each of the energy suppliers 520, 530, and 540. The energy supplied from each of the energy suppliers 520, 530, and 540 may be generated from any suitable renewable or nonrenewable source, for example, such as solar energy, wind energy, geo-thermal energy, hydropower, biomass, nuclear, and/or any other suitable renewable or nonrenewable energy source. In some embodiments, BMS 500 (e.g., via the BAS 502 or the energy management system 504) can monitor the energy pricing data from multiple established energy suppliers as well as from independent energy suppliers in the open energy market. While FIG. 5 shows three different energy suppliers 520, 530, and 540, the present disclosure is not limited thereto, and in other embodiments, the BMS 500 can monitor energy pricing data from any suitable number of energy suppliers that can supply energy to building 10.

For example, in some embodiments, the BAS 502 is shown collecting the energy pricing data from each of energy supplier 1 520, energy supplier 2 530, and energy supplier 3 540 over the network 508. In other embodiments, the energy management system 504 may collect the energy pricing data from each of the energy suppliers 520, 530, and 540 over the network 508. In some embodiments, the energy pricing data includes, for example, current price, forecasted price, peak demand prices, peak demand timings, and/or the like. In some embodiments, the BAS 502 (or the energy management system 504) collects the energy pricing data from each of the energy suppliers 520, 530, and 540 via any suitable interface, for example, such as an application programming interface (API).

In some embodiments, the energy management system 504 analyzes the energy pricing data and the energy load consumption data based on a forecasting model to output an energy demand forecast. For example, in some embodiments, the forecasting model analyzes the energy load consumption data, forecasted energy prices from the energy suppliers, historical data (e.g., historical energy usage data), occupancy data, temperature data, and/or the like, and outputs the energy demand forecast including the peak time of each of the energy suppliers, predicted load demands of building 10 for a future time period (e.g., the next day, the next week, the next month, and/or the like), and forecasted energy prices for the future time period. In some embodiments, the energy management system 504 generates a balanced load payload based on the energy demand forecast. For example, in some embodiments, the balanced load payload is generated to balance the predicted load demands across supply lines of the energy suppliers based on lowest pricing (or combination of pricings) from the energy suppliers and timing of when the predicted load demands are expected. Accordingly, the balanced load payload defines how much energy to procure, when to procure the energy, and from whom to procure the energy from among available ones of the energy suppliers 520, 530, and 540 to reduce or optimize costs.

Still referring to FIG. 5, in some embodiments, the energy management system 504 generates a smart contract based on the balanced load payload using the energy blockchain network 506 to procure energy from the energy suppliers 520, 530, and 540 in real-time or near real-time based on the smart contract. For example, in some embodiments, the energy management system 504 defines each of the terms and conditions of the smart contract in one or more blocks (or chains) of the energy blockchain network 506, and the energy blockchain network 506 facilitates execution, verification, and validation of the smart contract between the energy suppliers 520, 530, and 540 and an operator associated with the building 10 (e.g., a building owner, building manager, and/or the like). In some embodiments, the energy management system 504 generates the load balancing instructions to control the energy load balancer 516 to distribute power from the energy suppliers 520, 530, and 540 to the building 10 based on the balanced load payload and the terms and conditions of the smart contract.

Figure 6:
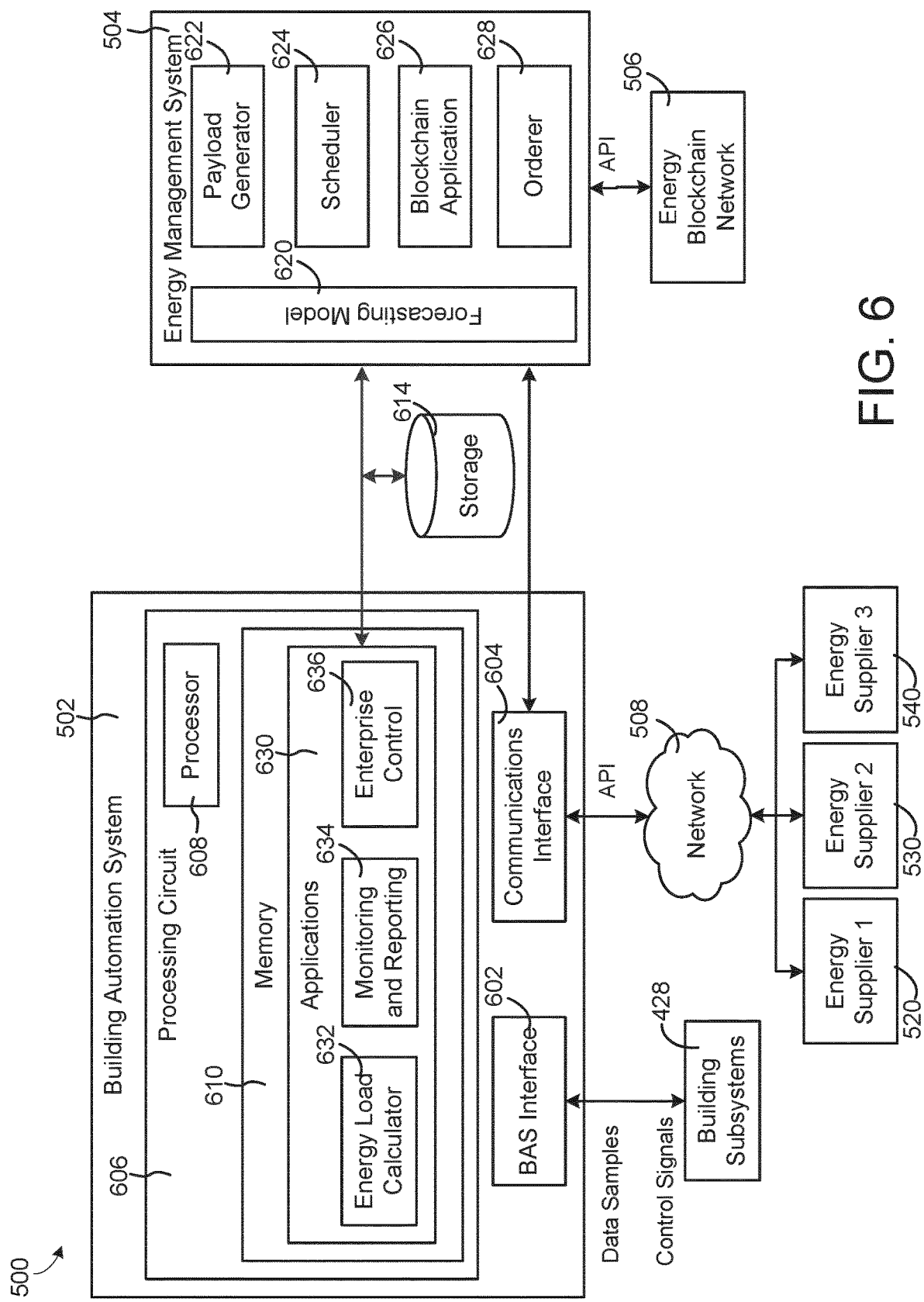
FIG. 6 is a block diagram of the building management system of FIG. 5 in greater detail, according to an example embodiment.

In more detail, referring to FIG. 6, a block diagram of the building management system 500 of FIG. 5 is shown in greater detail, according to some example embodiments. The BMS 500 includes the BAS 502, the energy management system 504, and the energy blockchain network 506. It should be noted that, in some embodiments, the components of BAS 502, energy management system 504, and/or energy blockchain network 506 may be integrated within a single device (e.g., a supervisory controller, a BAS controller, and/or the like) or distributed across multiple separate systems or devices. In other embodiments, some or all of the components of BAS 502, energy management system 504, and/or energy blockchain network 506 may be implemented as part of a cloud-based computing system configured to receive and process data from one or more building management systems. In this case, the cloud-based computing system can be one or a combination of, for example, MICROSOFT AZURE, AMAZON WEB SERVICES (AWS), a private computing cloud, and/or a public computing cloud. In other embodiments, some or all of the components of BAS 502, energy management system 504, and/or energy blockchain network 506 may be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

In some embodiments, BAS 502 is the same as or similar to BAS 400, as described with reference to FIG. 4, or includes many of the same components as BAS 400. For example, in some embodiments, BAS 502 includes a BAS interface 602 and a communications interface 604. In some embodiments, interfaces 602 and 604 include wired or wireless communications interfaces (e.g., jacks, antennas, transmitters, receivers, transceivers, wire terminals, etc.) for conducting data communications with building subsystems

428, energy suppliers 520, 530, and 540, or other external systems or devices. In some embodiments, communications conducted via interfaces 602 and 604 are direct (e.g., local wired or wireless communications) or via a communications network 508 (e.g., a WAN, the Internet, a cellular network, etc.).

In some embodiments, communications interface 604 facilitates communications between BMS 500 and the energy suppliers 520, 530, and 540 for monitoring the energy pricing data. In some embodiments, communications interface 604 also facilitates communications between BMS 500 and external applications and devices (e.g., remote systems and applications 444 and client devices 448) for allowing user control, monitoring, and adjustment to BMS 500. While FIG. 6 shows that the energy pricing data from the energy suppliers 520, 530, and 540 is monitored via the communications interface 604 of the BAS 502, the present disclosure is not limited thereto, and in other embodiments, the energy management system 504 may include a suitable interface for monitoring the energy pricing data from the energy suppliers 520, 530, and 540. BAS interface 602 facilitates communications between BMS 500 and building subsystems 428. The BMS 500 (including the BAS 502 and the energy management system 504) is configured to communicate with building subsystems 428 using any of a variety of building automation systems protocols (e.g., BACnet, Modbus, ADX, etc.). In some embodiments, BAS 502 receives data samples from building subsystems 428 and provides control signals to building subsystems 428 via BAS interface 602. In some embodiments, BAS 502 provides load balancing instructions to the energy load balancer 516 via BAS interface 602.

In some embodiments, building subsystems 428 include fire safety subsystem 430, lift/escalators subsystem 432, building electrical subsystem 434, information communication technology (ICT) subsystem 436, security subsystem 438, HVAC subsystem 440, lighting subsystem 442, and/or the like, as described with reference to FIG. 4. In some embodiments, building subsystems 428 include various devices 510, 512, and 514 that are associated with one or more of the various subsystems 428, as described with reference to FIG. 5. Further, in some embodiments, building subsystems 428 include the energy load balancer 516, as described with reference to FIG. 5. In various embodiments, building subsystems 428 include fewer, additional, or alternative subsystems or devices. For example, in some embodiments, building subsystems 428 also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control equipment, devices, and systems in the building. In some embodiments, building subsystems 428 include a waterside system and/or airside system. Each of building subsystems 428 can include any number of devices, controllers, and connections for completing its individual functions and control activities. In various embodiments, building subsystems 428 include building equipment (e.g., sensors, air handling units, chillers, pumps, valves, etc.) configured to monitor and control a building condition or status such as, for example, temperature, humidity, airflow, occupancy status, and/or the like.

In various embodiments, BAS 502 includes a processing circuit 606 including a processor 608 and memory 610. In some embodiments, each of the energy management system 504 and the energy blockchain network 506 also includes one or more processing circuits including one or more processors and memory. In various embodiments, each of the processors are a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.). In some embodiments, at least some of the processing circuits for the BAS 502, the energy management system 504, and the energy blockchain network 506 may be combined or may be separate from each other.

In some embodiments, memory includes one or more devices (e.g., memory units, memory devices, storage devices, etc.) for storing data and/or computer code for completing and/or facilitating the various processes described in the present disclosure. In various embodiments, memory includes random access memory (RAM), read-only memory (ROM), hard drive storage, temporary storage, non-volatile memory, flash memory, optical memory, or any other suitable memory for storing software objects and/or computer instructions. In various embodiments, memory includes database components, object code components, script components, or any other type of information structure for supporting the various activities and information structures described in the present disclosure. In some embodiments, memory is communicably connected to the processors via the processing circuits, and includes computer code for executing (e.g., by processor 608) one or more processes described herein.

In some embodiments, the BAS 502 includes one or more applications 630 including, for example, an energy load calculator application 632, a monitoring and reporting application 634, and an enterprise control application 636. Although only a few applications 630 are shown, it is contemplated that applications 630 include any of a variety of suitable applications configured to analyze and/or use data generated by building subsystems 428 and/or the energy management system 504 to perform any of the functions described herein. In some embodiments, each of the applications 630 may be a part of another layer (e.g., enterprise integration layer 410, demand response layer 414, FDD layer 416, and/or the like) of the BAS 502, or may be a separate layer of the BAS 502. In other embodiments, at least one of the applications 630 may be a remote application running on a remote system or device (e.g., remote systems and applications 444, client devices 448, and/or the like).

In some embodiments, the energy load calculator application 632 uses the data generated by the building subsystems 428 to calculate the energy load consumption data (or energy usage data) for building 10. For example, in some embodiments, the energy load calculator application 632 calculates the energy load consumption data based on data collected from one or more devices associated with the building subsystems 428. In some embodiments, the energy load calculator application 632 stores historical energy usage data in storage 614. In some embodiments, storage 614 also stores various data generated by building subsystems 428 (e.g., occupancy data, temperature data, schedule data, and/or the like). In some embodiments, storage 614 may be internal storage or external storage. For example, storage 614 can be internal storage with relation to BAS 502 and/or energy management system 504, and/or can include a remote database, cloud-based data hosting, or other remote data storage. In some embodiments, storage 614 may include a plurality of storage devices for storing the data that is generated, collected, or otherwise calculated from the building subsystems 428, and each of the storage devices may be internal storage or external storage.

In some embodiments, monitoring and reporting application 634 may provide notifications or alerts to a user or operator (e.g., a building owner, building manager, and/or the like) associated with building 10 in response to the generation of one or more smart contracts (or smart contract proposals). In some embodiments, monitoring and reporting application 635 may provide one or more views of the smart contract (or smart contract proposal) to the user associated with building 10. In some embodiments, the user may interact with the one or more views to accept, modify, and/or execute one or more terms of the smart contract (or smart contract proposal).

In some embodiments, the enterprise control application 636 performs various control activities for the BMS 500 or the building subsystems 428. For example, in some embodiments, the enterprise control application 636 may control energy load balancing equipment (e.g., the energy load balancer 516) associated with building 10 based on load balancing instructions generated from the energy management system 504. In some embodiments, the load balancing instructions may be used to balance and distribute energy from the energy suppliers 520, 530, and 540 to the load (e.g., the building subsystems 428) of building 10 in real-time or near real-time according to the smart contract.

In some embodiments, the applications 630 can use the data generated by the building subsystems 428 to perform a variety of data analysis, monitoring, and/or control activities. For example, in some embodiments, energy load calculator application 632 and monitoring and reporting application 634 use the data to generate user interfaces (e.g., charts, graphs, etc.) that present energy usage data or energy load data to a user (e.g., a building owner, building manager, or other user associated with the building 10). In some embodiments, the user interfaces present raw data samples associated with the energy load data in a single chart or graph. For example, a dropdown selector can be provided to allow a user to select the raw data samples or any of the derived energy load data as data rollups for a given data point. In another example, enterprise control 636 and monitoring and reporting application 634 may generate a user interface that presents the load balancing instructions proposed by the energy management system 504 associated with a smart contract (or smart contract proposal) to the user to determine how various loads within building 10 will be distributed across supply lines of the energy suppliers based on the smart contract (or smart contract proposal). In some embodiments, the user may interact with the user interface to make modifications or changes to the load balancing instructions, and in response, the energy management system may generate a new smart contract proposal (or modify the smart contract proposal) based on the modified load balancing instructions. In this case, in some embodiments, if the user makes modification or changes to the load balancing instructions, the newly generated smart contract is endorsed, verified, and validate by all the involved parties (e.g., selected peers) as discussed herein. Once the smart contract is endorsed, verified, and validate by all the parties, the smart contract is accepted by all the parties and blocks corresponding to the smart contract proposal are appended to a ledger database of each of the interested parties (e.g., the interested energy suppliers). In some embodiments, if any of the involved parties fail to endorse, verify, or validate the modified smart contract, then the smart contract is not accepted and it is discarded from execution in the blockchain network. In some embodiments, the discarded smart contract may still exist (e.g., stored) in the network, which can be later audited by the interested parties, but disabled from execution in the energy blockchain network 506.

Still referring to FIG. 6, in some embodiments, energy management system 504 receives the energy load consumption data and the energy pricing data from the BAS 502 and/or retrieves the energy load consumption data and/or the energy pricing data from storage 614. In various embodiments, the energy management system 504 generates smart contracts via the energy blockchain network 506 based on the energy load consumption data and the energy pricing data to procure energy corresponding to the projected energy needs of the building 10 from the energy suppliers 520, 530, and 540 in real-time or near real-time at a reduced or optimized energy cost. Accordingly, in some embodiments, energy management system 504 includes a variety of services configured to analyze and process the energy load consumption data and the energy pricing data to generate the smart contracts and the load balancing instructions based on the smart contracts. For example, in some embodiments, energy management system 504 includes a forecasting model 620, a payload generator 622, a scheduler 624, a blockchain application 626, and an orderer 628.

In some embodiments, the forecasting model 620 outputs an energy demand forecast for the building 10 based on the energy load consumption data of building 10, the energy pricing data of the energy suppliers 520, 530, and 540, and/or other data associated with or collected from building 10. In some embodiments, the other data may include, for example, occupancy status, occupancy time, temperature data (e.g., outside temperature, zone temperature, setpoint temperature, and/or the like), usage data, historical data, and/or the like. For example, in some embodiments, inputs to the forecasting model 620 may include the energy load consumption data for building 10, forecasted prices from the energy suppliers 520, 530, and 540, historical energy usage data of building 10, outside temperature (current or forecasted) corresponding to building 10, and occupancy status (current or projected) of building 10. In some embodiments, the forecasting model 620 calculates a predicted load demand for building 10 for a future time period (e.g., a net day, next week, and/or the like) based on the energy load consumption data, historical energy usage data, and the other data associated with building 10 (e.g., expected outside temperature, expected occupancy status of one or more zones (or spaces) within building 10, and/or the like). In some embodiments, the forecasting model 620 outputs the energy demand forecast including peak time of each of the energy suppliers, the predicted load demand for the building 10 for the future time period, and forecasted prices of each of the energy suppliers corresponding to the future time period. In some embodiments, the forecasting model 620 provides the energy demand forecast to the payload generator 622, and/or stores the energy demand forecast in storage 614.

In some embodiments, the payload generator 622 analyzes the energy demand forecast with other factors, for example, such as business strategy, contractual agreements with the energy suppliers, terms and conditions of the agreements, and/or the like, to calculate a balanced load payload. For example, in some embodiments, the payload generator 622 generates the balanced load payload for a suitable (e.g., optimal) cost-effective energy procurement solution based on the energy load demands of a client (e.g., the building owner), business strategy of the client, contractual agreement between the client and the energy suppliers, and/or the like. In some embodiments, the balanced load payload corresponds to the predicted load demand of the building 10 balanced across particular supply lines of particular energy suppliers at a specific period of time. For example, in some embodiments, the balanced load payload corresponds to the amount of energy needed from each available energy supplier for a future time period (e.g., a day, a week, a month, and/or the like) based on the forecasted peak time, forecasted energy prices of the energy suppliers, peak time energy charges, and predicted energy load of the building 10, which results in optimized energy load balancing based on, for example, current or forecasted lowest rates of the energy suppliers. Accordingly, in some embodiments, the amount of energy consumed from each energy supplier may vary in real-time (or near real-time) based on the peak demand timings and peak demand pricings of the energy suppliers in order to reduce or minimize the peak time energy consumption charges from a particular energy supplier.

In a non-limiting example, the payload generator 622 may generate the balanced load payload to switch the predicted load demand from one energy supplier to another energy supplier when peak demand charges kick in (or start) for the one energy supplier. In another non-limiting example, the payload generator 622 may generate the balanced load payload to balance the predicted load demand across the supply lines of at least two energy suppliers concurrently (or simultaneously) to reduce the amount of energy supplied from any one energy supplier. In still another non-limiting example, the payload generator 622 may generate the balanced load payload to limit a maximum amount of energy provided from a particular energy supplier by switching energy suppliers when the maximum amount is reached (or nearly reached). In yet another non-limiting example, the payload generator 622 may generate the balanced load payload to determine an order of the available energy suppliers from which to distribute energy for the predicted load demand based on energy prices and/or energy caps. In still yet another non-limiting example, the payload generator 622 may generate the balanced load payload to limit a maximum amount of energy provided from a particular energy supplier by balancing load on other supply lines when the maximum amount is reached (or nearly reached). Accordingly, in various embodiments, the payload generator 622 is configured to reduce the energy bill of the customer by calculating the balanced load payload to distribute energy from the available multiple suppliers having lower (or lowest) pricing points (e.g., when available), which reduces or minimizes peak demand charges of the energy bill, reduces or eliminates demand ratchet prices, and shifts to lower slab rates of the suppliers. While a few non-limiting example are described, it should be appreciated that the balanced load payload can be generated according to other examples or various combinations thereof based on the predicted load demand and energy prices in order to reduce energy costs.

In some embodiments, the scheduler 624 stores the balanced load payload calculated by the payload generator 622, and provides the balanced load payload to the blockchain application 626 to generate a smart contract proposal corresponding to the balanced load payload when a scheduling time is triggered. In some embodiments, the scheduling time may be defined as the time at which the energy blockchain network 506 is triggered to perform the smart contract endorsement or verification or validation or execution. In some embodiments, the scheduling time may be any suitable time period that is sufficient to procure the energy needed in real-time or near real-time to power the predicted load demand of building 10. For example, in some embodiments, the scheduling time occurs prior to or near the future time period corresponding to the balanced load payload. For example, if the balanced load payload data is computed daily for the expected loads of the building 10, the scheduling time may also occur daily (e.g., at the start of the day or at the end of a prior day). In another example, if the balanced load payload is computed for a particular week, the scheduling time may be triggered at the start of the particular week or at the end of a prior week. In yet another example, the scheduling time may correspond to a switching time of the energy suppliers as defined by the balanced load payload. In some embodiments, the scheduling time may be triggered based on an event, for example, such as a pricing change by one or more of the energy suppliers 520, 530, and 540, energy consumption change (increase or decrease) of the building 10, start of a particular season or time of the year, and/or the like. In some embodiments, the scheduling time may be user-defined (e.g., triggered by user command) or based on user preferences (e.g., user-defined threshold levels). However, the present disclosure is not limited thereto, and in other embodiments, for example, the scheduler 624 may be omitted and the balanced load payload data may be provided to the blockchain application 626 by the payload generator 622.

Still referring to FIG. 6, in some embodiments, the blockchain application 626 generates a smart contract proposal corresponding to the balanced load payload. For example, in some embodiments, the blockchain application 626 generates terms and conditions of the smart contract proposal based on the balanced load payload and the client's existing agreements and contracts with the energy suppliers 520, 530, and 540. In some embodiments, the blockchain application 626 simulates a chaincode corresponding to the smart contract proposal via the energy blockchain network 506, and selects a set of peers to endorse the simulated chaincode according to an endorsement policy. For example, in some embodiments, the set of peers may include all of the interested parties to the smart contract proposal (e.g., the energy suppliers, building owners, and/or the like) that must endorse the smart contract proposal in order to effectuate a smart contract. In some embodiments, each of the peers can endorse the smart contract proposal by simulating the chaincode and appending a cryptographic signature according to the endorsement policy, but other suitable methods for securely endorsing the smart contract proposal are contemplated. In some embodiments, after simulation, if the simulated smart contract proposal responses from all the selected peers do not match, it indicates an inconsistent response, and the smart contract proposal is discarded or rejected. On the other hand, in some embodiments, if the simulated smart contract proposal responses from all the selected peers match, the smart contract proposal is accepted and sent to the orderer 628 for further processing.

In some embodiments, once the simulated chaincode corresponding to the smart contract proposal is simulated and endorsed by all of the peers, the orderer 628 arranges each transaction proposal corresponding to the smart contract proposal into a well-defined sequence order, and defines (or packs) the ordered transaction proposals into one or more blocks of the energy blockchain network 506. In some embodiments, the energy blockchain network 506 generates a smart contract corresponding to the smart contract proposal by facilitating the verification and validation of the transaction proposals. For example, in some embodiments, when a block is filled with a maximum number of transaction proposals, the energy blockchain network 506 sends the block to each of the peers associated with the smart contract proposal. In some embodiments, each of the peers sequentially processes and verifies each (or respective ones) of the transaction proposals in the block according to the endorsement policy of the corresponding chaincode associated with the transaction proposals. In some embodiments, upon successful validation of the transaction proposals, the blocks are appended to a local ledger database of each of the peers and an event is generated. In some embodiments, the event includes full block content, chaincode events, and/or other transaction details. In some embodiments, the event alerts or notifies the blockchain application 626 of whether the smart contract was successfully generated (e.g., validated and successfully appended to the ledger databases) or was rejected.

In some embodiments, in response to the successful generation of the smart contract, the payload generator 622 generates load balancing instructions according to the balanced load payload corresponding to the generated smart contract. For example, in some embodiments, the balanced load payload corresponding to the generated smart contract may be load balancing instructions, and upon successful generation of the smart contract (e.g., execution, verification, and validation), the balanced load payload may be provided to the energy load balancer 516 as the load balancing instructions. In some embodiments, the payload generator 622 provides the load balancing instructions to the BAS 502, and the BAS 502 (e.g., via the enterprise control application 636) controls the energy load balancer 516 according to the load balancing instructions. Accordingly, the energy load balancer 516 distributes power from corresponding ones of the energy suppliers 520, 530, and 540 to the building 10 alternately and/or concurrently (or simultaneously) in accordance with the terms and conditions of the smart contract.

Figure 7:
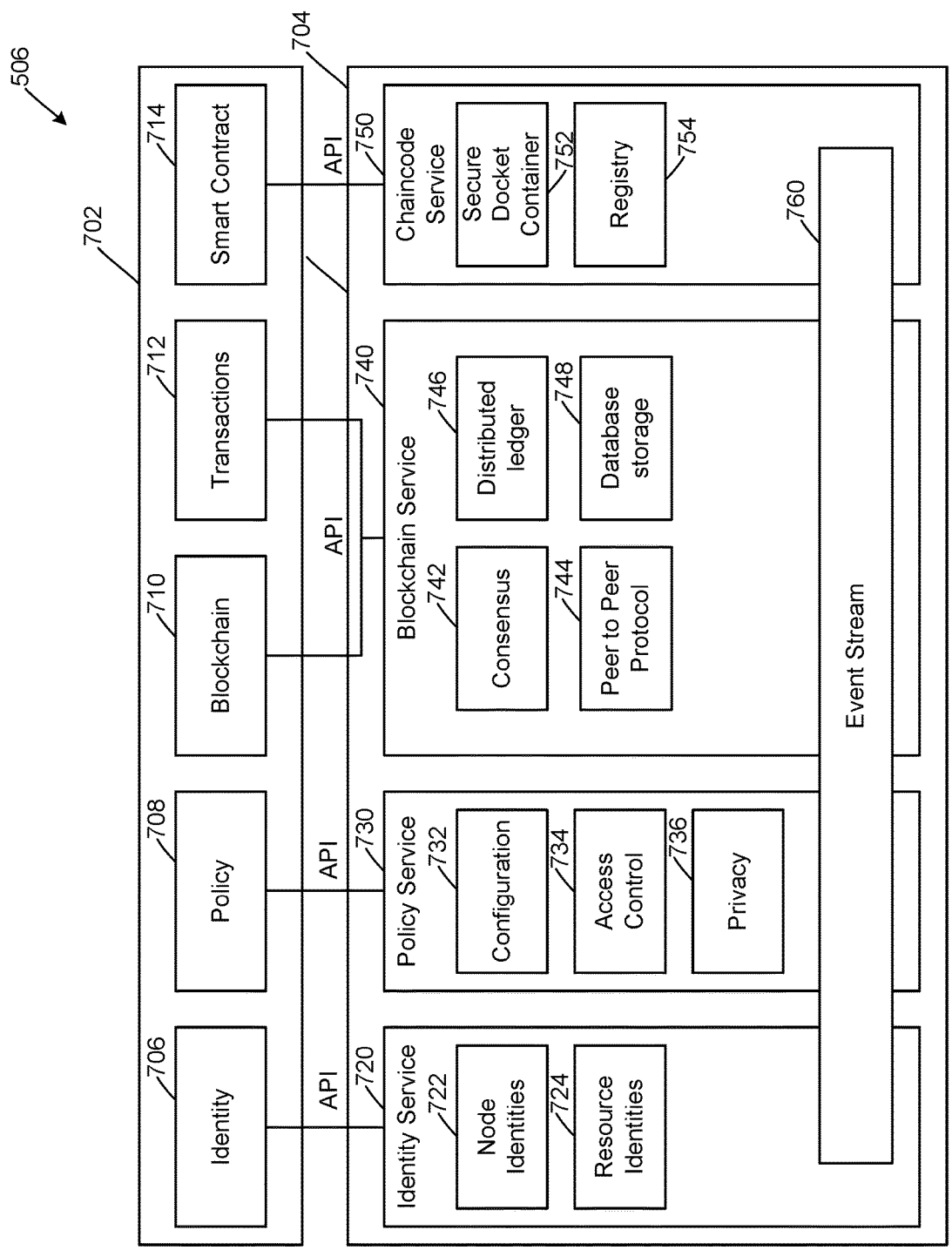
FIG. 7 is a block diagram of an energy blockchain network, according to an example embodiment.

FIG. 7 is a block diagram of an energy blockchain network in more detail, according to some embodiments. In some embodiments, the energy block chain network 506 may be similar to or the same as the energy block chain network 506 shown in FIGS. 5 and 6. In some embodiments, the energy block chain network 506 may be a private permissioned blockchain network, but the present disclosure is not limited thereto, and in other embodiments, the energy block chain network 506 may be any suitable public or private blockchain network that is permissioned or permission-less. As discussed herein, in various embodiments, the energy block chain network 506 facilitates the endorsement, verification, and validation of a smart contract.

Referring to FIG. 7, in some embodiments, the energy blockchain network 506 includes a software development kit (SDK) 702 and a plurality of services 704 configured to facilitate in the generation of the smart contract. For example, in some embodiments, the SDK 702 may facilitate communications between the energy management system 504 (e.g., the blockchain application 626) and the services 704 of the energy blockchain network 506 via any suitable interface (e.g., API). In some embodiments, the SDK 702 includes a plurality of modules 706, 708, 710, 712, and 714 for facilitating communications with corresponding services 720, 730, 740, and 750 of the energy blockchain network 506. For example, in some embodiments, SDK 702 includes an identity module 706 for facilitating communications with an identify service 720, a policy module 708 for facilitating communications with a policy service 730, a blockchain module 710 and a transaction module 712 for facilitating communications with a blockchain service 740, and a smart contract module 714 for facilitating communications with a chaincode service 750. In some embodiments, the services 704 include an event stream 760 to generate event alerts or notifications. However, the present disclosure is not limited thereto, and in other embodiments, the energy blockchain network 506 may include any suitable number of modules and/or services configured to facilitate the endorsement, verification, and validation of a smart contract or to perform any of the functions described herein.

In some embodiments, the identity service 720 enables the blockchain application 626 to select the set of peers associated with a smart contract, and is used to identify each member selected in the set of peers to endorse, verify, and validate the smart contract. In some embodiments, the node identities include, for example, digital identities of a node (e.g., orderer, energy suppliers, building owners, and/or the like) which will endorse, verify, and validate the smart contract. In some embodiments, the digital identity of a node includes various attributes, for example, such as node organization (e.g., energy supplier name, building owner name, and the like), node organization type (e.g., energy supplier type, building owner type, and the like), node role (e.g., peer, orderer, and the like), and/or any other suitable identifiers associated with a node. In some embodiments, the node identities determine the permissions over resources and access to information for the nodes in the energy blockchain network 506. In some embodiments, the resource identity includes various attributes, for example, such as user chaincode, system chaincode, and/or the like. For example, in some embodiments, the user chaincode may be the smart contract running on the peers systems, and the system chaincodes may be specialized chaincodes that help in executing the user chaincodes. For example, in some embodiments, energy supplier 1 node may be given permission to only execute the user chaincode resource identity. In another example, in some embodiments, the identity service 720 determines each node identities 722 (e.g., buildings, energy suppliers, and/or the like) associated with the smart contract, and each resource identities 724 (e.g., user chaincode, system chaincode) associated with the nodes.

In some embodiments, the policy service 730 enables policies imposed by each of the peers as determined by the identity service 720 to be applied to the smart contract. For example, in some embodiments, the policy service 730 hides confidential information in the smart contract between peers, and provides access control for each peer to respective portions of the smart contract proposal. For example, the policy service 730 enables each of the peers to configure policies that should be imposed in the smart contract via configuration 732, determines access control 734 for each of the peers to portions of the smart contract, and applies privacy rules or policies 736 for each of the peers when viewing the smart contract proposal. For example, pricing information for one energy supplier that is a peer to the smart contract may be hidden from another energy supplier that is also a peer to the smart contract. In another example, one energy supplier may not be granted access to transaction proposals in the smart contract associated with another one of the energy suppliers. In some embodiments, the policy service 730 determines the endorsement policies for each of the peers in order to endorse the chaincodes and/or transaction proposals according to the endorsement policies.

In some embodiments, the blockchain service 740 forms the core part of the energy blockchain network 506 discussed herein. For example, consensus 742 enables the energy management system 504 (e.g., blockchain application 626) to simulate the chaincode for the smart contract proposal for execution, validation, and verification as discussed herein. Peer to peer protocol 744 determines communications protocols of each of the peers to enable communications between peers. Distributed ledger 746 distributes (or appends) the one or more blocks (or chains) associated with a successfully generated smart contract (e.g., successful endorsement, validation, and verification) to the local ledger databases of the peers. Database storage 748 stores various data associated with the blockchain network 506.

In some embodiments, the chaincode service 750 enables the generation of the chain codes associated with the smart contract or smart contract proposal. For example, in some embodiments, the chaincode service 750 includes a secure docket container to enable the execution of the smart contract proposal (or smart contract). In some embodiments, the chaincode service 750 includes a registry 754 to identify the local ledger databases of each of the peers so that a successfully generated smart contract can be appended to the local ledger database of each of the peers.

In some embodiments, the event stream 760 generates event alerts or event notifications to notify each of the peers of the successfully generated smart contract or if the smart contract was rejected. The event alerts or event notifications include full block content, chaincode events, and other transaction details. Accordingly, in various embodiments, the energy blockchain network 506 facilitates the generation, execution, verification, and validation of smart contracts for procuring energy from various energy suppliers in real-time or near real-time.

Figure 8:
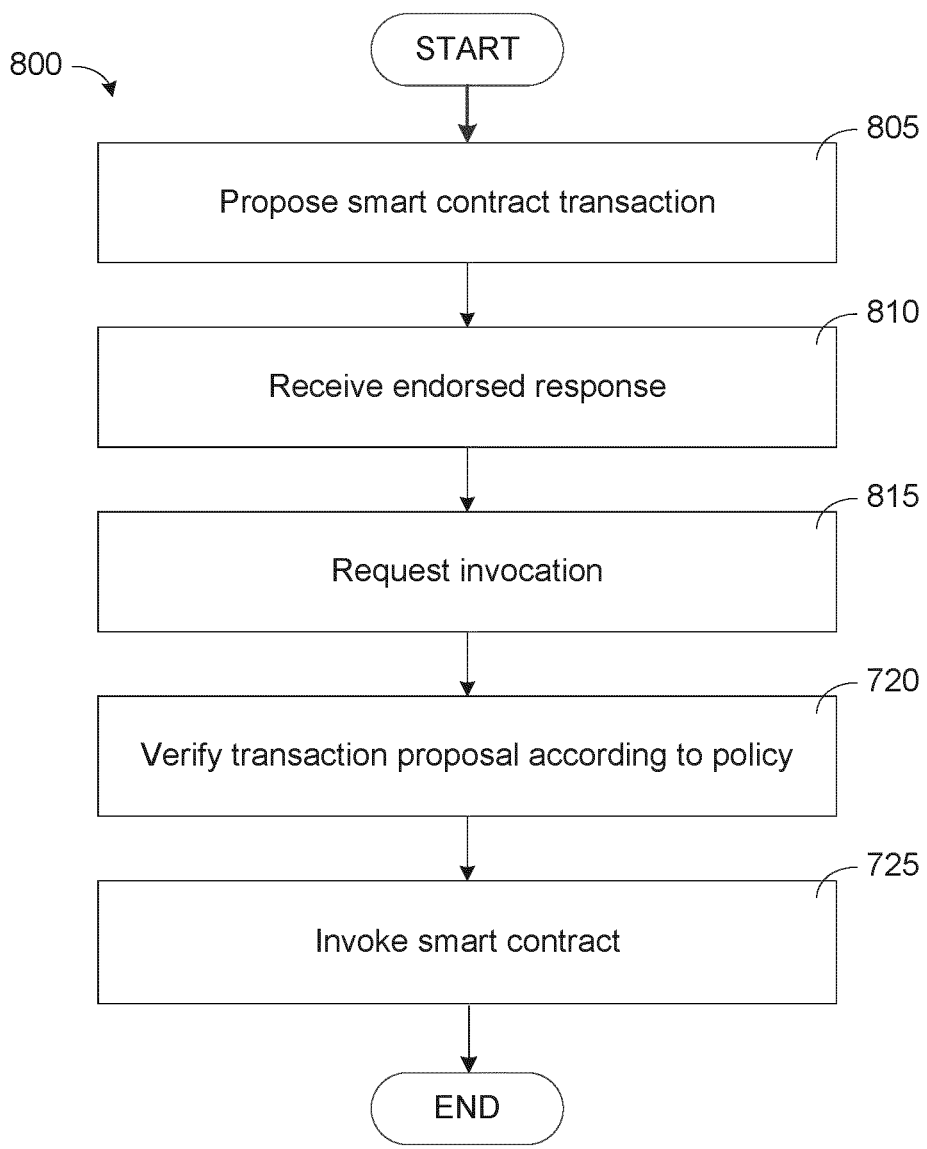
FIG. 8 is a flow diagram of a process for procuring energy using an energy block chain network, according to an example embodiment.

For example, FIG. 8 is a flow diagram of a process for procuring energy using an energy block chain network, according to an example embodiment. Referring to FIG. 8, the process starts and a smart contract transaction is proposed at block 805. For example, in some embodiments, the energy blockchain application 626 generates the smart contract transaction proposal corresponding to the balanced load payload, existing agreements with the energy suppliers, and/or the like. In some embodiments, the blockchain application 626 simulates a chaincode corresponding to the smart contract transaction proposal in the energy blockchain network 506, and selects a set of peers to endorse the smart contract transaction proposal. In some embodiments, each of the peers simulates the chaincode, and cryptographically signs the entire payload according to an endorsement policy, and simulates the transaction proposal. In some embodiments, the endorsed response of the smart contract transaction proposal is received at block 810. In some embodiments, all inconsistent transaction responses are discarded.

In some embodiments, the endorsed smart contract transaction proposal is sent to the orderer 628 to request invocation of the endorsed smart contract transaction proposal at block 815. In some embodiments, the orderer 628 arranges the transaction proposals of the smart contract transaction proposal into a well-defined sequence order, and packs the transaction proposals into one or more blocks of the energy blockchain network 506. In some embodiments, when a block is filled with a maximum number of transaction proposals, the blocks are sent to all of the selected set of peers to validate the transaction proposals.

In some embodiments, each of the peers verifies the transaction proposals according to policy at block 720. For example, in some embodiments, each of the peers sequentially processes and verifies each of the transaction proposals according to the endorsement policy of a corresponding chaincode used to generate the transaction proposal. In some embodiments, if validation fails, transactions are discarded (and not applied to the ledger). On the other hand, in some embodiments, upon successful validation of the transaction proposals, each the peers attempt to append this block in their local ledger database to invoke the smart contract at block 725, and the process ends. For example, after appending this block in the peer's local ledger, an event is generated. This event contains full block content, chaincode events, and other transaction details. This event is then delivered to applications (e.g., the blockchain application 626) that have registered for these events. In this way, the blockchain application 626 is notified that the transaction was successfully updated to the ledger databases or that the transaction was rejected. In response to successful generation of the smart contract, the blockchain application 626 informs the payload generator 622 to generate the load balancing instructions according to the successfully generated smart contract (e.g., the balanced load payload associated with the smart contract), and the load balancing instructions are provided to the energy load balancer 516 to distribute energy from the energy suppliers based on the smart contract in real-time or near real-time.

Configuration of Example Embodiments

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system communicably connected to an energy blockchain network to reduce energy costs of a building, the system comprising:
    an energy load balancer configured to distribute energy from a plurality of energy suppliers to power a load in the building;
    one or more processors; and
    memory coupled to the one or more processors and storing instructions that, when executed by the one or more processors, cause the one or more processors to:
        monitor energy pricing data from each of the plurality of energy suppliers;
        calculate a balanced load payload corresponding to an energy demand forecast for the building according to the energy pricing data from the plurality of energy suppliers, wherein the balanced load payload is calculated to cause the building to concurrently receive energy from two or more of the plurality of energy suppliers based on the energy pricing data;
        generate a smart contract corresponding to the balanced load payload in one or more blocks of the energy blockchain network, the smart contract corresponding to an agreement by the two or more energy suppliers to provide energy to power at least a portion of the balanced load payload based on the energy pricing data; and
        generate load balancing instructions for the energy load balancer based on the smart contract,
    wherein the energy load balancer is configured to switch to distribute energy concurrently from the two or more energy suppliers according to the load balancing instructions.

2. The building management system of claim 1, wherein to generate the smart contract, the instructions further cause the one or more processors to:
    generate a smart contract proposal corresponding to the balanced load payload;
    provide a chaincode simulation corresponding to the smart contract proposal to the two or more energy suppliers or to a user associated with the building; and
    receive an endorsement of the chaincode simulation from the two or more energy suppliers or from the user associated with the building according to an endorsement policy of the chaincode simulation.

3. The building management system of claim 2, wherein to generate the smart contract, the instructions further cause the one or more processors to:
    arrange proposed transactions corresponding to the smart contract proposal in a sequence order;
    pack the proposed transactions in the one or more blocks of the energy blockchain network; and
    distribute the one or more blocks to the two or more energy suppliers or to the user associated with the building.

4. The building management web system of claim 1, wherein the instructions further cause the one or more processors to:
    compare a first energy pricing of a first energy supplier of the plurality of energy suppliers of a first time period with a second energy pricing of the first energy supplier of a second time period; and
    detect a difference between the first energy pricing and the second energy pricing; and
    wherein the instructions further cause the one or more processors to calculate the balanced load payload responsive to detecting the difference.

5. The building management system of claim 1, wherein the instructions further cause the one or more processors to:
    receive an event notification in response to the one or more blocks being appended to one or more ledger databases associated with the building; and
    generate the load balancing instructions in response to the event notification.

6. The building management system of claim 1, wherein to calculate the balanced load payload, the instructions further cause the one or more processors to:
    collect data from one or more devices associated with building equipment of the building;
    calculate energy load consumption data based on the data collected from the one or more devices; and
    calculate the energy demand forecast based on the energy load consumption data, the energy demand forecast corresponding to a predicted load amount for the building during an interval of time;
    wherein calculating the balanced load payload comprises:
        balancing the predicted load amount to cause energy to be concurrently provided across supply lines corresponding to the two or more energy suppliers, the predicted load amount corresponding to the energy demand forecast for the building.

7. The building management system of claim 1, wherein the instructions further cause the one or more processors to:
    compare a first energy consumption of the building of a first time period with a second energy consumption of the building of a second time period; and
    detect a difference between the first energy consumption and the second energy consumption;
    wherein the instructions further cause the one or more processors to calculate the balanced load payload responsive to detecting the difference.

8. A method for reducing energy costs of a building, the method comprising:
    monitoring, by one or more processors, energy pricing data from each of a plurality of energy suppliers;
    calculating, by the one or more processors, a balanced load payload corresponding to an energy demand forecast for the building according to the energy pricing data from the plurality of energy suppliers, wherein the balanced load payload is calculated to cause the building to concurrently receive energy from two or more of the plurality of energy suppliers based on the energy pricing data;
    generating, by the one or more processors, a smart contract corresponding to the balanced load payload in one or more blocks of an energy blockchain network, the smart contract corresponding to an agreement by the two or more energy suppliers to provide energy to power at least a portion of the balanced load payload based on the energy pricing data; and generating, by the one or more processors, load balancing instructions for an energy load balancer of the building based on the smart contract, wherein the energy load balancer is configured to switch to distribute energy concurrently from the two or more energy suppliers according to the load balancing instructions.

9. The method of claim 8, wherein to generate the smart contract, the method further comprises:

generating, by the one or more processors, a smart contract proposal corresponding to the balanced load payload;

providing, by the one or more processors, a chaincode simulation corresponding to the smart contract proposal to the two or more energy suppliers or a user associated with the building; and receiving, by the one or more processors, an endorsement of the chaincode simulation from the two or more energy suppliers or from the user associated with the building according to an endorsement policy of the chaincode simulation.

10. The method claim 9, wherein to generate the smart contract, the method further comprises:

arranging, by the one or more processors, proposed transactions corresponding to the smart contract proposal in a sequence order;

packing, by the one or more processors, the proposed transactions in the one or more blocks of the energy blockchain network; and distributing, by the one or more processors, the one or more blocks to the two or more energy suppliers or the user associated with the building.

11. The method of claim 10, wherein to generate the smart contract, the method further comprises:

receiving, by the one or more processors, validation of the one or more blocks from the two or more energy suppliers or from the user associated with the building; and appending, by the one or more processors, the one or more blocks to one or more ledger databases associated with the two or more energy suppliers or the user associated with the building.

12. The method of claim 11, wherein the method further comprises:

receiving, by the one or more processors, an event notification in response to the one or more blocks being appended to the one or more ledger databases; and generating, by the one or more processors, the load balancing instructions in response to the event notification.

13. The method of claim 8, wherein to calculate the balanced load payload, the method further comprises:

collecting, by the one or more processors, data from one or more devices associated with building equipment of the building;

calculating, by the one or more processors, energy load consumption data based on the data collected from the one or more devices;

calculating, by the one or more processors, the energy demand forecast based on the energy load consumption data, the energy demand forecast corresponding to a predicted load amount for the building during an interval of time; and balancing, by the one or more processors, the predicted load amount across supply lines corresponding to the two or more energy suppliers based on the energy pricing data.

14. The method of claim 8, wherein the energy blockchain network is a private permissioned blockchain network.

15. One or more non-transitory computer readable media containing program instructions that, when executed by one or more processors, cause the one or more processors to perform operations comprising:

monitoring energy pricing data from each of a plurality of energy suppliers;

calculating a balanced load payload corresponding to an energy demand forecast for a building according to the energy pricing data from the plurality of energy suppliers, wherein the balanced load payload is calculated to cause the building to concurrently receive energy from two or more of the plurality of energy suppliers based on the energy pricing data;

generating a smart contract corresponding to the balanced load payload in one or more blocks of an energy blockchain network, the smart contract corresponding to an agreement by two or more energy suppliers to provide energy to power at least a portion of the balanced load payload based on the energy pricing data; and generating load balancing instructions for an energy load balancer of the building based on the smart contract, wherein the energy load balancer is configured to switch to distribute energy concurrently from the two or more energy suppliers according to the load balancing instructions.

16. The one or more non-transitory computer readable media of claim 15, wherein to generate the smart contract, the instructions further cause the one or more processors to perform operations comprising:

generating a smart contract proposal corresponding to the balanced load payload;

providing a chaincode simulation corresponding to the smart contract proposal to the two or more energy suppliers or a user associated with the building; and receiving an endorsement of the chaincode simulation from the two or more energy suppliers or from the user associated with the building according to an endorsement policy of the chaincode simulation.

17. The one or more non-transitory computer readable media of claim 16, wherein to generate the smart contract, the instructions further cause the one or more processors to perform operations comprising:

arranging proposed transactions corresponding to the smart contract proposal in a sequence order;

packing the proposed transactions in the one or more blocks of the energy blockchain network; and distributing the one or more blocks to the two or more energy suppliers or the user associated with the building.

18. The one or more non-transitory computer readable media of claim 17, wherein to generate the smart contract, the instructions further cause the one or more processors to perform operations comprising:

receiving validation of the one or more blocks from the two or more energy suppliers or from the user associated with the building; and appending the one or more blocks to one or more ledger databases associated with the two or more energy suppliers or the user associated with the building.

19. The one or more non-transitory computer readable media of claim 18, wherein the instructions further cause the one or more processors to perform operations comprising:
- receiving an event notification in response to the one or more blocks being appended to the one or more ledger databases; and
- generating the load balancing instructions in response to the event notification.

20. The one or more non-transitory computer readable media of claim 15, wherein to calculate the balanced load payload, the instructions further cause the one or more processors to perform operations comprising:
- collecting data from one or more devices associated with building equipment of the building;
- calculating energy load consumption data based on the data collected from the one or more devices;
- calculating the energy demand forecast based on the energy load consumption data, the energy demand forecast corresponding to a predicted load amount for the building during an interval of time; and
- balancing the predicted load amount across supply lines corresponding to the two or more energy suppliers based on the energy pricing data.

* * * * *